US005702500A

United States Patent [19]

Llanos et al.

[11] Patent Number: 5,702,500
[45] Date of Patent: Dec. 30, 1997

[54] INTEGRATED PROCESS FOR THE RECOVERY OF METALS AND FUSED ALUMINA FROM SPENT CATALYSTS

[75] Inventors: Zenon R. Llanos, Lake Jackson, Tex.; Guido F. Provoost, Ghent, Belgium; William G. Deering, Angleton, Tex.; Frans J. Debaene, Merelbeke, Belgium

[73] Assignee: Gulf Chemical & Metallurgical Corporation, Freeport, Tex.

[21] Appl. No.: 552,075

[22] Filed: Nov. 2, 1995

[51] Int. Cl.[6] .................. C22B 4/04; C22B 9/16; C22B 23/00; C22B 21/00

[52] U.S. Cl. .................. 75/10.25; 75/10.48; 75/10.65; 75/430; 75/738; 423/68; 423/133; 423/150.2

[58] Field of Search .................. 75/10.25, 10.48, 75/10.65, 430, 738; 423/54, 133, 68, 150.2

[56] References Cited

U.S. PATENT DOCUMENTS

| | | | |
|---|---|---|---|
| 4,087,510 | 5/1978 | Steenken | 423/53 |
| 4,142,871 | 3/1979 | Zeiringer et al. | 51/308 |
| 4,349,381 | 9/1982 | Cichy | 75/10 R |
| 4,384,885 | 5/1983 | Muller et al. | 75/10 R |
| 5,013,533 | 5/1991 | Howard et al. | 423/133 |

FOREIGN PATENT DOCUMENTS 2908570  9/1980  Germany .................. C22B 7/00

OTHER PUBLICATIONS

Llanos et al., "Treatment of Spent Hydroprocessing Catalysts at Gulf Chemical and Metallurgical Corporation", presented SME Annual Meeting Mar. 2–6, 1986.

Primary Examiner—David A. Simmons
Assistant Examiner—J. A. Lorengo
Attorney, Agent, or Firm—Michael A. Lechter

[57] ABSTRACT

An integrated process for the treatment of spent catalysts containing mainly molybdenum, vanadium, nickel, cobalt and, alumina to produce ammonium metavanadate, vanadium pentoxide, molybdic trioxide, fused alumina and a high grade nickel/cobalt alloy essentially free of aluminum.

16 Claims, 1 Drawing Sheet

INTEGRATED PROCESS FOR THE RECOVERY OF METALS AND FUSED ALUMINA FROM SPENT CATALYSTS

BACKGROUND OF THE INVENTION

1. Field of the Invention

The present invention relates to the treatment of materials containing alumina, silica, nickel, cobalt, molybdenum and vanadium. More specifically, the present invention relates to the treatment of spent catalysts and the recovery of valuable metals such as molybdenum, vanadium, nickel, cobalt and fused alumina by a combination of hydrometallurgical and pyrometallurgical processes.

2. Background of the Invention

In general, methods for treatment of spent catalysts are known. Examples of prior art systems are described in: U.S. Pat. No. 5,013,533 issued to Howard et al on May 7, 1991; U.S. Pat. No. 4,087,510 issued to Steenken on May 2, 1978; U.S. Pat. No. 4,384,885 issued to Müller on May 24, 1983; U.S. Pat. No. 4,142,871 issued to Zeiringer on Mar. 6, 1979; and U.S. Pat. No. 4,349,381 issued to Cichy on Sep. 14, 1982; Offenlengunsschrift U.S. Pat. No. 2,908,570, published on Sep. 18, 1980; and in Llanos et al, "Treatment of Spent Hydroprocessing Catalysts at Gulf Chemical and Metallurgical Corporation", presented at the Society of Mining Engineers of AIME, annual meeting Mar. 2–6, 1986. For example, U.S. Pat. No. 4,087,510 discloses mixing one part of finely ground spent catalysts with 0.5 to 0.9 parts of sodium carbonate and roasting the mixture at 650°–850° C. for about 1 to 2 hours. The roasted material is then dissolved in water to recover most of the molybdenum and vanadium in solution, along with 1–2% of the alumina contained in the catalyst. This process, however, does not recover aluminum, nickel or cobalt in commercially acceptable forms. U.S. Pat. No. 4,384,885, describes reducing spent catalysts, free of vanadium, in the presence of carbon and CaO, in an electric furnace at temperatures below 1700° C., to produce metallic alloy. The alloy is ground, roasted and leached with ammonium hydroxide to recover molybdenum and cobalt; as well as calciumalumina slag with little or no commercial value. U.S. Pat. No. 4,142,871 discloses a process to prepare abrasive materials from spent catalysts. Roasted spent catalysts are mixed with a reducing agent, melted in an electric furnace, and cooled to produce a metallic alloy, a mixture of alloy and slag and an abrasive alumina. U.S. Pat. No. 4,349,381 discloses a process for smelting spent catalysts using two furnaces. Slag, produced from melting spent catalysts in the first furnace, is transported to a second furnace for adjustment of composition and quantity. This process however, does not address the recovery of molybdenum and vanadium as separate saleable products. In Offenlengunsschrift No. 2,908,570 a method is described in which raw spent catalysts are first melted in an electric furnace in the presence of coke and CaO to produce a slag containing CaO, Al2O3 and SiO2 with little or no commercial value and, an alloy containing the heavy metals. The separation and recovery of metals from the alloy required grinding followed by roasting at 750° C. and leaching with soda ash to dissolve molybdenum and vanadium leaving nickel, cobalt and iron as a residue. This residue was leached with sulfuric acid to dissolve and recover nickel and cobalt sulfate salts.

In general, however, prior to the present invention there remained a need for a process to recover valuable metals (e.g., molybdenum, vanadium, nickel, cobalt and fused alumina) from spent hydroprocessing catalysts in commercially acceptable forms and without the generation of solid wastes.

SUMMARY OF THE INVENTION

The present invention provides an economical, integrated method for the recovery of valuable metals from, e.g., spent hydroprocessing catalysts in commercially acceptable forms and, without the generation of solid wastes and can assimilate spent catalysts of a wide composition range as well as other materials of similar composition. Spent catalysts are mixed with alkaline materials such as sodium carbonate and roasted at temperatures between 1400°–1800° F. (650°–900° C.) to convert molybdenum, vanadium and part of the sulfur into their respective soluble sodium salts. The roasted material in leached with water to obtain a solution laden with molybdenum and vanadium and a residue containing a portion of the molybdenum and vanadium, all the alumina, nickel, cobalt, silica and some sodium in the form of sodium aluminum silicate. The solution is treated with ammonium salts to separate vanadium metavanadate which may be converted into vanadium pentoxide. The remaining solution is further acidified to precipitate molybdic acid which may be converted into molybdic trioxide. The leach residue is dried and reduced in the presence of carbon to produce a high grade alloy of nickel and cobalt, fused alumina substantially free of sodium and, to vaporize most of the sodium. The sodium is recovered in the form of sodium hydroxide and is recycled to the roasting and leaching operations.

BRIEF DESCRIPTION OF THE DRAWING

The preferred exemplary embodiment of the present invention will hereinafter be described in conjunction with the appended drawing, where the sole figure is a schematic block diagram of a process in accordance with the present invention.

DETAILED DESCRIPTION OF A PREFERRED EXEMPLARY EMBODIMENT

Figure 1:
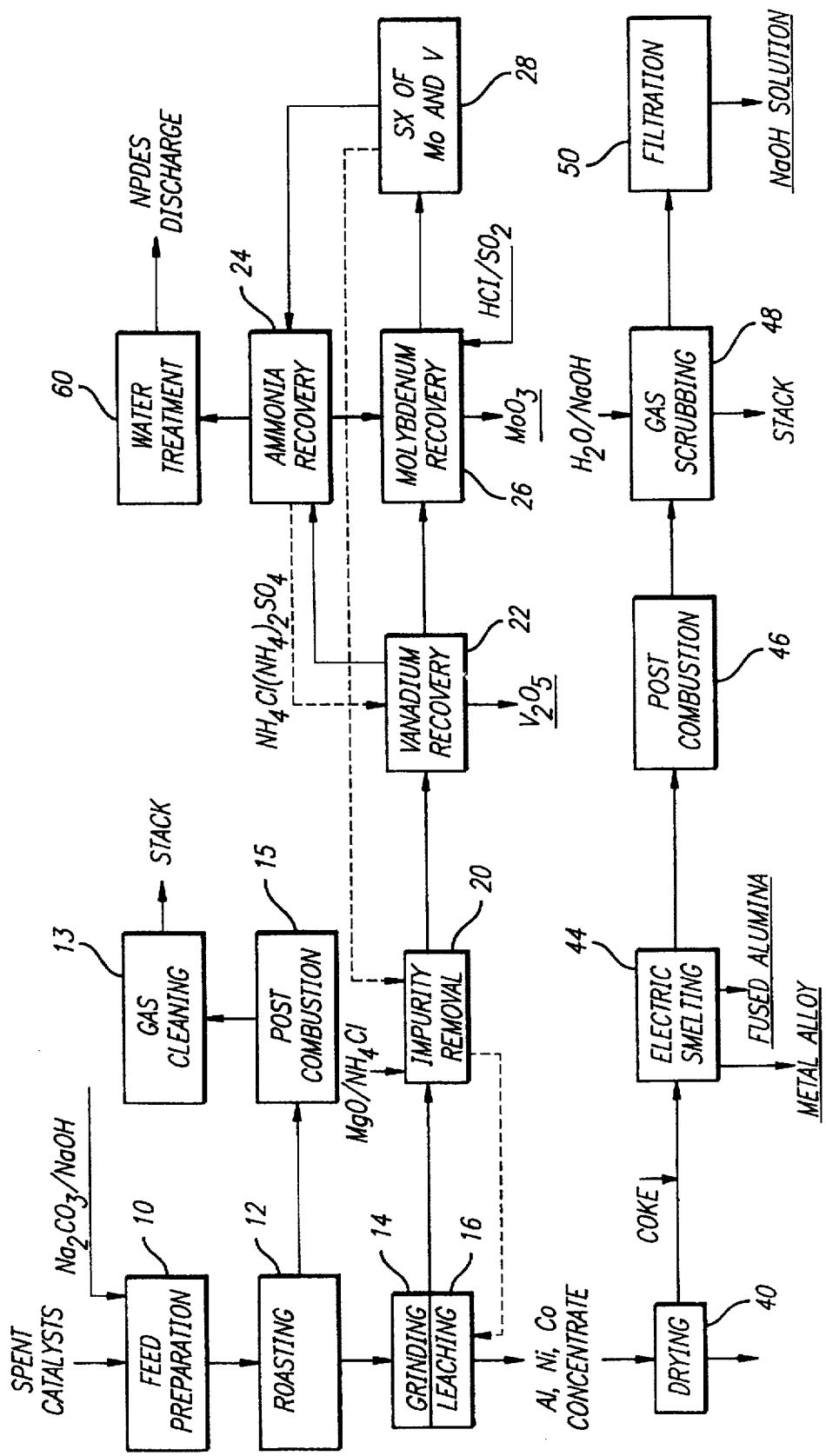

Referring to FIG. 1, source material containing valuable metals (e.g., molybdenum, vanadium, nickel, cobalt and alumina) to be recovered, e.g., spent catalysts, without prior treatment, is mixed with a sodium salt, preferably sodium carbonate, and/or sodium sulfate at a predetermined ratio, e.g., 0.2 to 0.3 parts of sodium salt per one part of source material (e.g., spent catalyst) (Step 10). The sodium salt is suitably in the form of granular sodium carbonate, although, as will be discussed, a portion of the sodium salt is suitably fed back from later in the process in the form of a sodium sulfate or sodium hydroxide solution. The mixing is suitably effected in a conventional mixer or blender.

The mixture is then transferred into a suitable furnace (Step 12) wherein it is roasted to remove water and hydrocarbons in the spent catalyst, and form soluble metallic salts of the metals to be recovered. The roasting process may be effected in any suitable furnace, for such time periods and such temperatures to remove water and hydrocarbons in the spent catalyst to a desired level, e.g., burning out the carbon to less than 0.1%, and react substantially all of the molybdenum and vanadium to the sodium carbonate to form respective sodium salts.

The roasting process is preferably effected using a multi-zone furnace operating with a separate post combustion chamber (PCC). The furnace is suitably a Herreshoff type, multiple hearth furnace, with an upper zone operating to evaporate the water in the catalyst, and volatilize hydrocarbons, and, a lower zone operating to combust fixed carbon, oxidize sulfitic compounds, and generate the respective sodium salts of the metals to be removed. The mixture is roasted in the furnace for approximately four hours. Operation of the furnace with two distinct zones tends to minimize the conversion of sulfur into $SO_2$.

In the preferred embodiment, the upper zone operates in a pyrolysis mode, under reducing conditions, e.g., at a temperature, e.g., 450°–600° C. and an oxygen content less than three percent, to evaporate the water in the catalyst, and volatilize hydrocarbons. The volatilized hydrocarbons are suitably withdrawn from the pyrolysis zone into a separate post combustion chamber (PCC) (Step 15) where they are burnt with or without the addition of natural gas.

The lower zone of the furnace operates at temperatures gradually increasing from 600° to 900° C. in a progressively more oxidative mode, i.e. with oxygen level increasing with temperature. The temperature in each hearth of the furnace is controlled by adding natural gas and increasing the oxygen concentration from about three percent in the pyrolysis zone to seventeen percent at the bottom discharge. In this zone, the combustion of fixed carbon takes place and the sulfitic compounds are oxidized, generating the respective metallic oxides and sulfur dioxide. The carbon content of the material exiting the roasting furnace is preferably below 0.1 percent. Nearly all the molybdenum and vanadium react with sodium to form their respective sodium salts.

The gases generated by the roasting process are suitably cleaned, using conventional methods, and exhausted to atmosphere (Step 13). Under the preferred operating conditions, less than half of the sulfur in the spent catalyst is converted into sulfur dioxide and exhausted into the atmosphere. The balance of the sulfur is converted into sodium sulfate which is eventually discharged in the process waste water. The gases from the lower zone are also withdrawn into the PCC to complete the combustion of unreacted hydrocarbons. During the roasting operation, a small quantity of sulfur trioxide is typically formed. The sulfur trioxide is suitably removed in the PCC by spraying dilute sodium hydroxide which combines to form sodium sulfate and sulfite which are collected in electrostatic precipitators and returned to the furnace.

When the source material is spent catalyst, the roasted material exiting the furnace contains soluble salts of molybdenum, vanadium, sulfur, and phosphorous, and insoluble oxides of nickel, cobalt, silica and alumina. In accordance with one aspect of the invention, the soluble salts and insoluble oxides are separated, and the soluble salts treated for the recovery of molybdenum and vanadium, while the remaining solids are processed to form commercially acceptable metal alloy (e.g., a high grade alloy of nickel and cobalt) and fused alumina products.

More specifically, the roasted material is ground (Step 14) and leached with water (Step 16) to dissolve the soluble salts. The insoluble material is filtered out to produce a filter cake containing about 70% solids, which is, as will be described, treated in an electric furnace to produce fused alumina, metal alloy, and recoverable sodium. The leach solution, containing molybdenum, vanadium and small quantities of phosphorous is, as will be described, successively processed to remove impurities (Step 20), recover vanadium (Step 22), recover molybdenum (Step 26) and recover ammonium (Step 24), which is recycled back to various parts of the process.

As noted above, when the source material is spent catalyst, the roasted material exiting the furnace contains soluble salts of molybdenum, vanadium, sulphur and phosphorous, and insoluble oxides of nickel, cobalt, silica, and alumina. The output of the furnace is conveyed to a suitable grinder (Step 14). The grinding step may be effected with any mechanism that appropriately conditions the material for the selected leaching process. The ground material is then conveyed to a series of leaching tanks, wherein they are leached with water to dissolve the soluble salts of molybdenum and vanadium. The leaching process effectively separates the soluble salts of molybdenum, vanadium, sulphur and phosphorous, and insoluble oxides of nickel, cobalt, silica and alumina. The volume of water is sufficient to keep the molybdenum and vanadium in solution. The solution containing the soluble salts is then suitably treated to remove impurities (Step 20). More specifically, the solution is treated with a suitable magnesium or ammonium compound, such as, for example, ammonium chloride and magnesium oxide, to precipitate phosphorous. The resulting magnesium ammonium phosphate is recycled to the leaching circuit.

The purified solution is then subjected to a vanadium recovery process (Step 22). Vanadium pentoxide is suitably produced by precipitating ammonium metavanadate (AMV; $NH_4VO_3$) from a solution, then calcinating (heating) the AMV precipitate to form vanadium pentoxide and ammonia ($NH_3$) gas. The calcination furnace is suitably a multiple hearth multi-zone furnace. The AMV is suitably precipitated from the purified solution by treatment with a suitable ammonium salt, such as, ammonium chloride and/or ammonium sulfate. The amount of ammonium salt used is chosen in accordance with the pH and vanadium concentration in solution. Preferably, pH should be between 8.5 and 9 and the amount of ammonium used should be equivalent to the stoichiometric requirement for the formation of $NH_4VO_3$ plus enough ammonia to have at least 12 gpl of ammonia ($NH_3$) in the mother liquor. Under these conditions, the vanadium concentration in solution can be reduced to less than 0.5gpl after two hours. Molybdenum, however, is not precipitated.

The precipitated ammonium metavanadate is filtered and washed to generate a filter cake containing 75% solids. The washing is effected to separate the molybdenum (in solution) and ammonium metavanadate. Preferably, washing efficiency is such that the concentration of molybdenum in the filter cake is below 0.1%.

The ammonium metavanadate can be sold as a wet or dry AMV or, preferably, is converted into vanadium pentoxide ($V_2O_5$) and ammonia ($NH_3$) gas by calcination. The AMV solids (filter cake) are conveyed to a suitable calcination furnace. Subjected to temperatures above 450° C. and an oxidizing atmosphere, the AMV decomposes into granular $V_2O_5$ and ammonia gas. If desired the granular $V_2O_5$ can be melted and flaked in a water cooled flaking wheel.

The gases generated during calcination are filtered to remove any dust, and applied to a conventional ammonium ($NH_3$) recovery process (scrubbing process) (Step 24). More specifically, ammonia gas is brought into contact with diluted solutions of hydrochloric acid and sulfuric acid to produce ammonia chloride ($NH_4Cl$) and ammonia sulphate (($NH_4)_2SO_4$) in solution. The solution is recycled back to the vanadium recovery step 22.

The solution remaining after the precipitation of AMV and filtration washing (Step 22) contains molybdenum. That solution is routed to a molybdenum recovery process (Step 26) to produce molybdic trioxide ($MoO_3$). More specifically, the mother liquor from the AMV precipitation (Step 22) is directed to series of reactors (tanks with agitators). The solution is then heated to a predetermined temperature, e.g., near boiling, 80°–90° C. Sulfur dioxide is added to reduce the residual vanadium ions and, hydrochloric acid is added to lower the pH to below 1.1. Ultimately, (e.g., after about two hours of reaction), molybdenum precipitates as molybdic acid, a solid granular material, while the reduced vanadyl ions remain in solution. The reaction is continued until the concentration of molybdenum in solution reaches a desired level, e.g., below 0.5 gpl.

The molybdic acid is then suitably filtered, using, e.g., a vacuum filter, and washed. Molybdic acid is then converted into molybdic trioxide. More specifically, the molybdic acid solids (filter cake) are conveyed to a suitable calcination furnace operated at a temperature, e.g., above 450° C., sufficient to remove water hydration from the molybdic acid to thereby generate molybdic trioxide. The gases from the calcination are suitably filtered and scrubbed with a suitable solvent, to capture any ammonia that might be generated during the calcination.

The solution remaining after the precipitation of molybdic acid still contains residual molybdenum and vanadium. The solution is suitably routed to a process for recovering the residual molybdenum and vanadium (Step 28). The recovery is suitably effected using a solvent extraction process. More specifically, the solution is suitably neutralized to a predetermined pH level, e.g., 2.0–2.5 and oxidized with, e.g., hydrogen peroxide. The oxidized solution is treated with an organic solution containing a suitable quaternary amine, preferably Aliquat 336, to extract the residual molybdenum and vanadium. These elements are stripped from the organic solution using a mixture of sodium hydroxide and sodium chloride or sodium sulfate. The strip liquor, containing sodium molybdate and vanadate, is recycled to the impurity removal process (Step 20) and then rerouted through the vanadium recovery process and molybdenum recovery process (Steps 22, 26) in sequence.

The raffinate, suitably containing less than 10 ppm Mo, less than 30 ppm V and, about 10–13 gpl NH3, is preferably processed for recovery of ammonia. The raffinate is suitably treated with sodium hydroxide to raise its pH to, e.g., about 11–12.5 and is fed to the top of a conventional packed bed column. Steam and air are introduced at the bottom of the column at a rate sufficient to maintain the temperature of the solution near its boiling point while simultaneously stripping the ammonia in solution down to a desired level, e.g., 100 ppm or less. The stripped gaseous ammonia is recovered, by scrubbing with dilute hydrochloric or sulfuric acid and reused for AMV precipitation. The ammonia depleted solution is treated for control of pH, temperature, and suspended solids (Step 60) then discharged, for example, through an NPDES outfall.

As previously noted, the soluble salts and insoluble oxides are separated (Steps 14, 16), and, the soluble salts are treated for the recovery of molybdenum and vanadium (Steps 22,24, 28). In addition, the remaining solids are, in accordance with one aspect of the invention, processed to form a commercially acceptable metal alloy (e.g., a high grade alloy of nickel and cobalt) and fused alumina which is essentially free of sodium.

The filter cake from the leaching operations (Step 16), containing alumina, nickel, cobalt, silica and sodium oxides, is conveyed to a suitable flash dryer to remove the moisture from the filter cake material (Step 40). The filter cake typically includes up to 25–35% moisture. The dryers suitably brings the moisture level down to a desired level, e.g., less than 2% (suitable for introduction into an electric arc furnace). The dried material is then mixed with a suitable reducing agent, e.g., coke, or other form of carbon. The amount of reducing agent mixed with the filter cake is chosen to be in excess of the stoichiometric requirement for the complete reduction of oxides of nickel, cobalt, molybdenum, vanadium, iron, silicon and sodium. More specifically, the amount of reducing agent is preferably 10 to 30% above the stoichiometric requirement for complete reduction.

The mixture is then subjected to a temperature greater than the melting point of the highest melting point of individual components/elements. More specifically, the mixture is suitably conveyed to a conventional electric arc furnace (Step 44) capable of generating temperatures above the melting point of alumina, e.g., 1800° to 2200° C. The mixture is suitably fed into the electric arc furnace at a controlled rate to avoid the foaming of sodium vapor. A reduction smelting is thus carried out to produce: 1) an alloy containing nearly all the nickel, cobalt, molybdenum, vanadium, iron, and silicon and, essentially free of aluminum and sodium, 2) fused aluminum oxide suitable for refractory and ceramics applications (suitably aluminum oxide with less than 0.2% sodium oxide) and, 3) sodium hydroxide suitable for reuse in the roasting, leaching, and ammonia recovery operations.

Production of fused alumina with low sodium content is particularly desirable. The smelting time, temperature, and amount of reducing agent are chosen so that substantially all of the sodium is vaporized to facilitate recovery for reuse in the process, and minimize the sodium in the fused alumina. It is also desirable that most of the silica be reduced into silicon metal. Accordingly, an excess of reducing agent is added; the amount of reducing agent is calculated not only to ensure complete reaction, but also to add silica to the alloy end product. Preferably, at least 60%, and preferably 80% is reduced into the metallic phase. This makes the metal alloy more friable, and brittle, to facilitate further processing.

The sodium is recovered from the electric furnace off gases, containing dust and sublimed sodium, phosphorous, magnesium and, combustible compounds such as carbon monoxide and hydrogen by withdrawing the off gas into a combustion chamber (Step 46). Air and natural gas, if needed, are injected into the combustion chamber to complete the incineration of carbon monoxide and hydrogen. The gases leaving the combustion chamber are then suitably treated in a venturi scrubber (Step 48) to remove particulate matter and condense sodium into aqueous sodium hydroxide. A packed bed scrubber, for the removal of sulfur dioxide, suitably follows the venturi scrubber. The scrub liquor consists of 10–15% NaOH and sodium sulfate. The particulate matter is filtered (Step 50) from the scrub liquor and returned to the flash dryer. A portion of the scrub liquor is bled off to control the sodium hydroxide concentration and returned to the roasting (Step 10,12,15), leaching (Step 16) and ammonia recovery (Step 24) operations.

The foregoing is a description of preferred exemplary embodiments and best mode of the invention known to the applicant at the time of filing the application. The invention is not limited to the specific forms shown. For example, modifications may be made in the design and arrangement of the elements within the scope of the invention, as expressed in the appended claims.

What is claimed:

1. An integrated process for the treatment of spent catalysts containing mainly molybdenum, vanadium, nickel, cobalt, alumina and silica to produce ammonium metavanadate, vanadium pentoxide, molybdic trioxide, fused alumina and a high grade nickel/cobalt alloy essentially free of aluminum, the integrated process comprising the following steps:

roasting the spent catalysts in the presence of a sodium salt at temperatures between 650°–900 °C.;

grinding and leaching the roasted material to obtain a Mo/V laden solution and a residue containing aluminum, nickel and cobalt;

separating the vanadium from molybdenum by selective precipitation to produce vanadium pentoxide and molybdic trioxide;

reducing the aluminum, nickel and cobalt containing residue in an electric furnace to produce a nickel/cobalt alloy, fused alumina; and recovering sodium in a concentrated sodium hydroxide solution.

2. The process of claim 1 where the amount of sodium salts is equivalent to 20–30% of the spent catalyst's weight.

3. The process of claim 1 where the roasting is conducted in a roaster having first and second zones, where the first zone operates in a pyrolysis mode with less than 3% oxygen and, the second zone operates in an oxidative mode with 3–17% oxygen.

4. The process of claim 1 where ammonium metavanadate is separated from molybdenum by adding ammonium chloride and ammonium sulfate to the leach solution in a quantity sufficient to have at least 12 gpl $NH_3$ in the mother liquor.

5. The process of claim 4 where the ammovanadium penadate is calcined to produce vanadium pentoxide.

6. The process of claim 1 where molybdic acid is recovered from the vanadium mother liquor by adding sulfur dioxide, to reduce vanadium ions and prevent them from precipitating, heating the solution to above 80° C. and, acidifying the solution to a pH below 1.1 and preferably between 0.6 to 1.1.

7. The process of claim 6 where the molybdic acid is calcined to produce molybdic trioxide.

8. The process of claim 1 where the leach residue, containing alumina, nickel, cobalt and sodium, is thermally reduced in the presence of carbon in an electric furnace to produce a) metallic alloy containing nearly all the nickel and cobalt and, essentially free of aluminum and sodium; b) fused aluminum oxide suitable for ceramic and refractory applications and, containing less than 0.2% sodium and c) a solution of sodium hydroxide containing 10–15% NaOH which is recycled to the roasting and leaching operations.

9. The process of claim 6 where the amount of carbon used is equivalent to the stoichiometric required to reduce the oxides of nickel, cobalt, iron, molybdenum, vanadium and sodium, and silicon.

10. The process of claim 8 where at least 60 percent of the silica is reduced into the alloy to impart it brittleness for subsequent processing of the alloy.

11. The process of claim 8 where the thermal reduction is carried out at temperatures between 1800°–2200° C.

12. The process of claim 8 comprising of volatilizing the sodium and recovering it in an aqueous sodium hydroxide form.

13. The process of claim 8 where the recovery of sodium from the furnace off-gases is carried out by:

introducing the off-gases into a combustion chamber to complete the burning of combustible compounds with the addition of air and natural gas; and treating the gases from the combustion chamber in a scrubber to remove the particulate matter and condense sodium vapor into aqueous sodium hydroxide for reuse in the roasting and leaching operations.

14. The process of claim 13 where the sodium recovery is carried out ahead of the combustion chamber.

15. The process of claim 1 where the electric furnace is a DC arc furnace with a single electrode.

16. The process of claim 1 wherein the sodium salt is chosen from the group consisting of sodium carbonate, sodium sulfate, and combinations thereof.

* * * * *

UNITED STATES PATENT AND TRADEMARK OFFICE
CERTIFICATE OF CORRECTION

PATENT NO. : 5,702,500
DATED : Dec. 30, 1997
INVENTOR(S) : Zenon R. Llanos, et al.

It is certified that error appears in the above-identified patent and that said Letters Patent is hereby corrected as shown below:

Column 8, line 10, "claim 6" should read --claim 8--.

Signed and Sealed this

Sixteenth Day of June, 1998

*Attest:*

BRUCE LEHMAN

*Attesting Officer*    *Commissioner of Patents and Trademarks*